United States Patent
Katayama

(10) Patent No.: US 6,249,402 B1
(45) Date of Patent: Jun. 19, 2001

(54) MAGNETIC HEAD SLIDER

(75) Inventor: Masaki Katayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/264,360

(22) Filed: Mar. 8, 1999

(30) Foreign Application Priority Data

Mar. 12, 1998 (JP) ................................. 10-061422

(51) Int. Cl.⁷ ............................. G11B 21/24; G11B 5/55; G11B 5/60
(52) U.S. Cl. ..................... 360/234.7; 360/294.4
(58) Field of Search ............. 360/234.7, 294.1, 360/294.4, 294.3

(56) References Cited

U.S. PATENT DOCUMENTS

| | | | |
|---|---|---|---|
| 4,605,977 | * | 8/1986 | Matthews ........................ 360/103 |
| 4,912,351 | * | 3/1990 | Takata et al. .................... 310/323 |
| 5,025,346 | * | 6/1991 | Tang et al. ...................... 361/283.1 |
| 5,223,998 | * | 6/1993 | Tokuyama et al. .............. 360/103 |
| 5,764,432 | * | 6/1998 | Kasahara ......................... 360/75 |
| 5,856,896 | * | 1/1999 | Berg et al. ....................... 360/104 |
| 5,920,978 | * | 7/1999 | Koshikawa et al. ............. 29/603.12 |
| 5,943,189 | * | 8/1999 | Boutaghou et al. ............. 360/103 |
| 5,959,808 | * | 9/1999 | Fan et al. ........................ 360/106 |

FOREIGN PATENT DOCUMENTS

| | | | |
|---|---|---|---|
| 1-286186 | * | 11/1989 | (JP) . |
| 4265584 | | 9/1992 | (JP) . |
| 6314479 | | 11/1994 | (JP) . |
| 8180623 | | 7/1996 | (JP) . |
| 9-022519 | * | 1/1997 | (JP) . |
| 981924 | | 3/1997 | (JP) . |
| 9-081924 | * | 3/1997 | (JP) . |
| 11-053854 | * | 2/1999 | (JP) . |

* cited by examiner

Primary Examiner—William Klimowicz
(74) Attorney, Agent, or Firm—Greer, Burns & Crain, Ltd.

(57) ABSTRACT

In a magnetic head slider, in which a slider film is formed on the surface of a substrate or on the surface of a sacrificial layer provided on the substrate so that the substrate or the substrate and the sacrificial layer are separate from the slider film, in an MR head on the inductive layer on the track of a medium, there is provided a rotary mechanism 21 supported by the stationary section 20a of the slider film so that a portion 24 of the slider film can be rotated on a surface substantially parallel to the surface of the recording medium and, in the movable section 24 of the rotating mechanism, there is provided an opposing magnetic pole of the magnetic head element 22 which is opposed to at least the recording medium.

6 Claims, 5 Drawing Sheets

MAGNETIC HEAD SLIDER

BACKGROUND OF THE INVENTION

1. Field of the Invention

The present invention relates to a magnetic head slider used for a magnetic disc unit.

In recent years, a strong demand for increasing the density of magnetic recording has arisen. Therefore, the magnetic disc unit has been made compact, its performance has been highly enhanced, and its cost has been reduced. In accordance with the recent tendency, it is desired to develop a thin film magnetic head of high performance and low cost. In order to meet the demand, a horizontal magnetic head, in which a thin film pattern forming surface is arranged in parallel with an air bearing surface, has been proposed. The reason is described as follows. In the case of a horizontal magnetic head, it is easy to form flying rails having specific shapes. Therefore, it is possible to realize a magnetic head capable of flying stably close to the disc surface, and further it is easy to reduce a portion to be machined in the manufacturing process, and furthermore the horizontal magnetic head can be easily handled and the cost can be lowered.

2. Description of the Related Art

For the above reasons, there is proposed a magnetic head slider capable of being manufactured in a manufacturing process in which machining is seldom conducted. This magnetic head slider is disclosed in Japanese Unexamined Patent Publication No. 9-81924, the tile of which is "Thin film magnetic head slider and electrostatic actuator thereof" which discloses a magnetic head slider on which a horizontal head element is mounted. After flying rails and thin film head elements have been formed on a substrate via a sacrificial layer, a conductor to be used as a terminal connecting section is formed by means of plating and, at the same time, a slider body is formed by a conductor.

Another prior art is disclosed in Japanese Unexamined Patent Publication No. 4-265584. According to the above patent publication, in order to accurately control a position of a magnetic head element on a recording track, a plurality of sliding sections surrounding the magnetic head element are fixed to a head support via piezoelectric elements which can be extended and contracted in the vertical direction and used for controlling the posture of the magnetic head and the magnetic head elements are fixed to the head support via a support section.

Japanese Unexamined Patent Publication No. 6-314479 discloses a magnetic head slider, which is composed as follows. An angle formed between a straight line connecting a magnetic or geometrical center of a reading head with that of a writing head and a tangent of a track at the head position is made constant in the entire seek range, so that both a yaw angle of the reading head and that of the writing head are made constant to provide a magnetic disk unit of high reliability. The position of the dual head is detected by a position detecting means. According to a result of the detection, a yaw angle adjusting means is driven, and the angle formed between the straight line connecting the magnetic or geometrical center of the reading head with that of the writing head and the tangent of the track at the head position is made constant. Due to the foregoing, both the yaw angle of the reading head and that of the writing head are made constant in the entire seek range.

According to Japanese Unexamined Patent Publication No. 8-180623, in order to enhance the positioning accuracy of a magnetic head in a magnetic disc unit so as to increase the density of recording, at a forward end portion of a load arm, there are provided a rotary spring for supporting a rotating slider and an inching drive means for moving the slider in the track direction relative to the load arm.

In the magnetic head slider described in the above Japanese Unexamined Patent Publication No. 9-81924, information recorded on a medium is read and written by a head element provided on this slider. In this case, the head element is composed of MR head exclusively used for reading and an inductive head used for writing. These MR head and inductive head are laminated in this order.

When MR head and the inductive head line up in a straight line on the track of the medium in the case of reading and writing, the track density must be a maximum. However, in an actual reading and writing operation, an actuator is rotated round the center of a spindle located outside of the medium from the inside to the outside in the effective range of the disc-shaped medium. Therefore, in the major part of the track, MR head and the inductive head are shifted from a straight line parallel to the track. A value of $\cos \theta$ makes a contribution to the reading and writing of a signal, wherein $\theta$ is an angle formed between a straight line connecting MR head with the inductive head and a tangent which represents a direction of the track. Therefore, in the case where $\theta=0$ is not satisfied, the signal intensity is lowered. For the above reasons, it is impossible to increase the density of the track to the maximum.

SUMMARY OF THE INVENTION

It is an object of the present invention to provide a magnetic head slider in which a rotating mechanism is provided in a portion of the above magnetic head slider and the head element is rotated by the rotating mechanism so that MR head and the inductive head can line up in a straight line on the track of the medium.

According to the present invention, there is provided a magnetic head slider adapted to be opposed to a recording medium comprising: a slider film body provided on a surface of a substrate or on a surface of a sacrificial layer provided on a substrate, the substrate or the sacrificial layer and substrate being separate from the slider film body; a rotating mechanism supported by a stationary section of the slider body so that a movable section of the rotating mechanism which is a portion of the slider body can be rotated in a plane substantially in parallel to a surface of the recording medium, and at least an opposed magnetic pole of a magnetic head element adapted to be opposed to the recording medium, provided in a movable section of the rotating mechanism.

In the present invention, a portion of the slider film body, that is, a movable portion of the slider film body can be rotated by a minute angle with respect to a stationary portion. Therefore, the direction of the opposing magnetic poles of the magnetic head element can be made constant with respect to the direction of the track of the recording medium at all times. For example, it is possible to keep the straight line connecting the MR head with the inductive head to coincide with the direction of the track at all times. Accordingly, it is possible to accomplish the object of increasing the track density of a recording medium.

The movable section may be supported by the stationary section via at least one support spring, the head slider further comprising a drive-force-generating section for driving the movable section with respect to the stationary section against an elastic force of the support spring, by an electrostatic attraction force acting between the opposed surfaces of the movable and the stationary sections when a voltage is applied between opposed surfaces.

In this connection, the drive-force-generating section may comprise a stationary section having a plurality of teeth parallel to each other, a movable section having a plurality of teeth parallel to the teeth of the stationary section, said support spring for supporting the movable section so that the movable section can be moved with respect to the stationary section in a tooth width direction, and said drive-force generating section for moving the movable section to a position at which an electrostatic attraction force in the tooth width direction generated when a voltage is applied between the teeth of the stationary section and those of the movable section, is balanced with said elastic force of the support spring.

Due to the above arrangement, when the voltage to be impressed is determined in accordance with a yaw angle formed between the straight line connecting MR head with the inductive head and the track direction, it is possible to rotate the movable section by a desired angle. Therefore, it becomes possible to make the yaw angle to be zero at all times.

In one aspect, the drive mechanism to drive the movable section with respect to the stationary section is composed of a piezoelectric element. In this case, in the same manner as that described before, when the voltage to be impressed upon the electrode of the piezoelectric element is changed according to the yaw angle, it is possible to rotate the movable section by a desired angle. Therefore, the yaw angle can be made zero at all times.

Also, the movable section may be driven with respect to the stationary section so that an angle formed between the direction of the magnetic head element and the direction of the track on the recording medium can be made constant. In this case, the movable section is driven with respect to the stationary section so that the direction of the magnetic head element can follow the track on the recording medium.

DETAILED DESCRIPTION OF THE PREFERRED EMBODIMENTS

Figure 1:
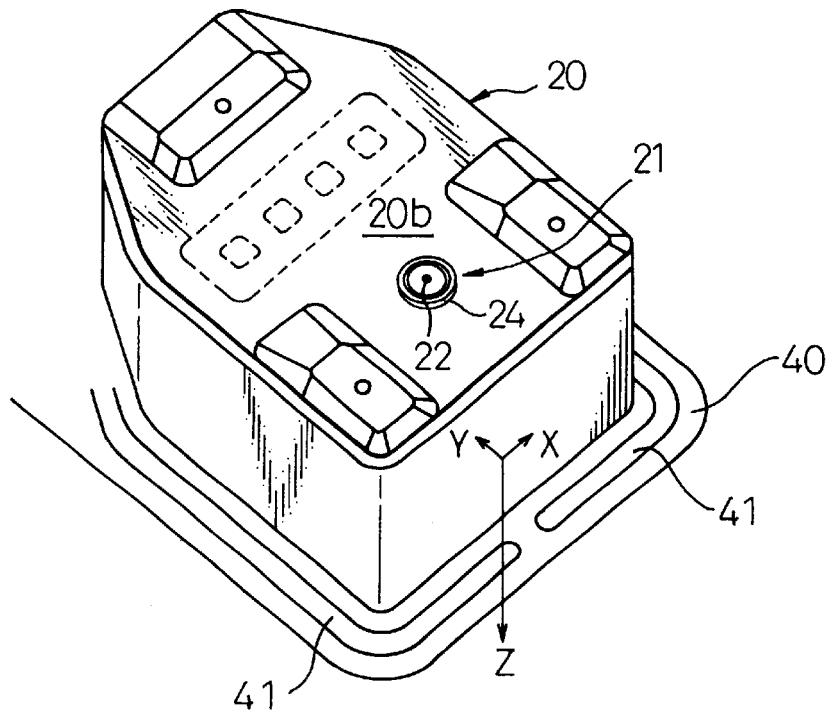
FIG. 1 is a perspective view of a magnetic head slider of the present invention, seen from a side opposing to a recording medium.
Figure 2A:
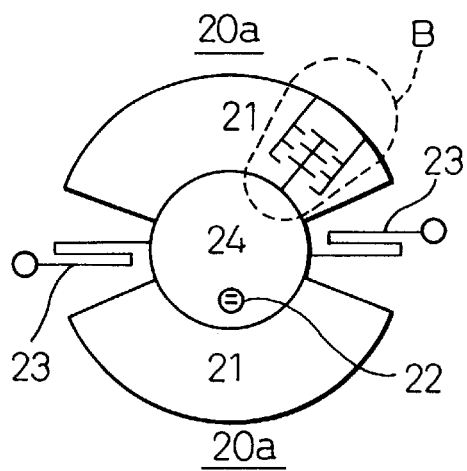
FIG. 2(a) is a plan view of an electrostatic actuator of a magnetic head slider of the present invention.
Figure 2B:
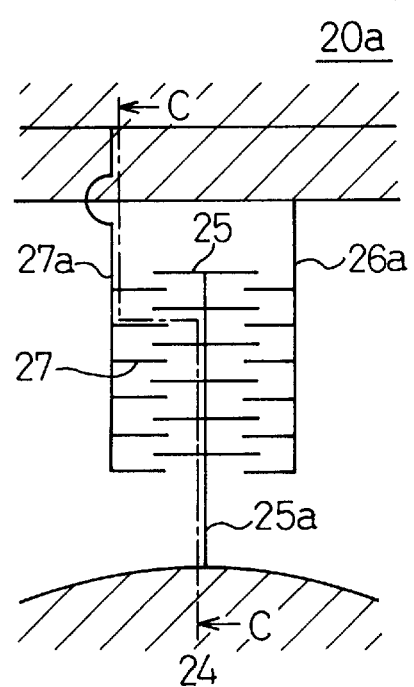
FIG. 2(b) is an enlarged view showing a portion indicated by broken line B in FIG. 2(a)

FIG. 1 is a perspective view showing an overall magnetic head slider of the present invention, and FIGS. 2(a) and 2(b) are plan views showing an electrostatic actuator.

In FIG. 1, the size of the magnetic head slider 20 is assumed to be not more than 08T. The size of the flying surface of the 08T magnetic head slider 20 is approximately 800 $\mu$m×600 $\mu$m. The thickness of the 08T magnetic head slider 20 is approximately several tens to several hundreds $\mu$m. The outer diameter of the electrostatic actuator 21 (movable section 24) shown in FIG. 1 is approximately 100 $\mu$m. In FIG. 1, the head element 22 is mounted on the electrostatic actuator 21 (movable section 24). Therefore, an end portion of the head element 22 can be seen from the outside. The magnetic head slider 20 is mounted on a head suspension 40 composed of a leaf spring. The head suspension 40 is provided with a groove 41 for pivotally supporting the slider 20 in the rolling direction (transverse direction) and the pitching direction (longitudinal direction).

FIG. 2(a) is a plan view showing an outline of the electrostatic actuator 21. The movable section 24 is supported in such a manner that it can be rotated with respect to the slider body 20, that is, with respect to the stationary section 24 in the rotational direction on a surface (surface 20b opposed to a medium in FIG. 1) which is substantially parallel to a surface of the recording medium (not shown).

Outside the movable section 24, there are provided support springs 23, for supporting the head element 22, which are connected to the slider body 20 (stationary section 20a). The movable section 24 on which the head element 22 is mounted is flying from the slider body 20, that is, the movable section 24 is connected to the slider body 20 only via the springs 23. Therefore, the movable section 24 can be rotated when it is given a force.

FIG. 2(b) is an enlarged view showing a portion B indicated by broken line in FIG. 2(a). A plurality of tooth support bars 25a (only one tooth support bar is shown in the drawing) are extended from the movable section 24 to the outside in the radial direction and support a plurality of teeth 25, which are arranged in parallel to each other, substantially in parallel to the rotational circumferential direction of the movable section 24. These teeth 25 are connected to the movable section 24, however, they are flying from the slider body 20.

On the other hand, from the slider body 20 (stationary section 20a), a plurality of tooth support bars 26a, 27a (two tooth support bars are shown in the drawing) are extended to the inside in the radial direction. A plurality of stationary teeth 26, 27, which are substantially parallel to the teeth 25 of the movable section 24, are connected to the tooth support bars 26a, 27a.

Since a voltage is impressed upon the teeth 25, 26, 27 and the bar portions 25a, 26a, 27a for generating electrostatic forces, it is preferable that they are made of metal, for example, it is preferable that they are made of Ni or Cu, or alternatively, it is preferable that they are subjected to plating with metal.

The magnetic head slider and electrostatic actuator of the present invention can be manufactured by the same method as that described in Japanese Unexamined Patent Publication No. 9-81924. Referring to FIGS. 3 and 4, an outline of the manufacturing method will be explained below. In this connection, FIGS. 3 and 4 substantially correspond to cross-section C—C shown in FIG. 2(b).

First, manufacturing is conducted as shown in FIGS. 3(a) to 3(e).

Figure 3A:
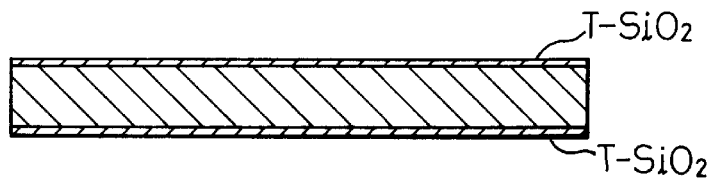
FIGS. 3(a) to 3(e) are schematic illustrations for explaining the first half of a formation process of forming a magnetic head slider, especially an electrostatic actuator section of the present invention, wherein these views are arranged in the order of the formation process.

In FIG. 3(a), there is prepared (100)Si substrate, on both sides of which thermal oxidation film T—SiO$_2$ is provided.

Figure 3B:
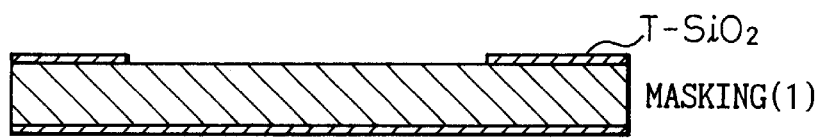

In FIG. 3(b), using a mask, thermal oxidation film T—SiO$_2$ is removed by means of ion milling only from the body of the movable section 24, the teeth 25, 25a of the movable section 24, the teeth 26, 27 (26a, 27a) of the stationary section 20a, and the portions in which the support springs 23 are formed.

Figure 3C:
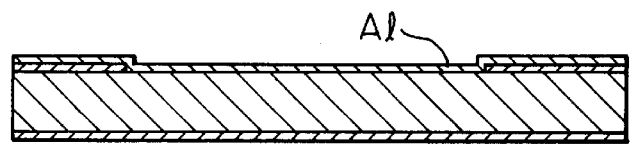

In FIG. 3(c), an Al film, to be used as a sacrificial layer, is formed on the surface of a substrate by means of vapor deposition or spattering.

Figure 3D:
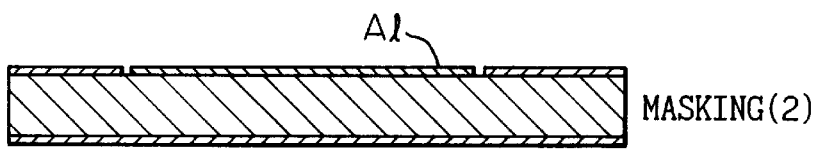

In FIG. 3(d), portions from which the thermal oxidation film T—SiO$_2$ has been removed are left alone, and an Al sacrificial layer is removed from other portions by means of ion milling. In this case, a small gap is formed in a boundary between the Al sacrificial layer and the thermal oxidation film.

Figure 3E:
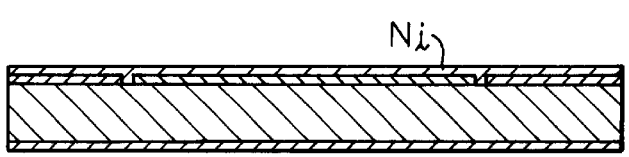

In FIG. 3(e), NiFe is vapor-deposited or sputtered on the overall surface so that it can be used as an underlayer of plating. This under-layer also enters the above gap.

Next, manufacturing is conducted as shown in FIGS. 4(a) to 4(e).

Figure 4A:
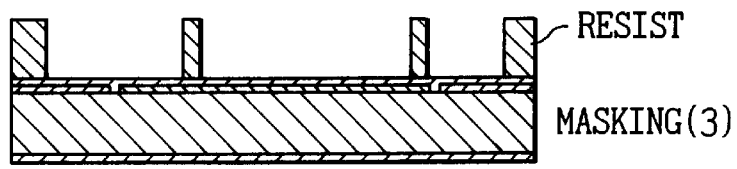
FIGS. 4(a) to 4(e) are schematic illustrations for explaining the latter half of the formation process, which succeed FIGS. 3(a) to 3(e), of forming a magnetic head slider, especially an electrostatic actuator section of the present invention, wherein these views are arranged in the order of the formation process.

In FIG. 4(a), photoresist is coated, and patterning is conducted for forming the stationary section 20a, the movable section 24, the support means spring 23, the stopper, the support and the lead wire by Ni-plating.

Figure 4B:
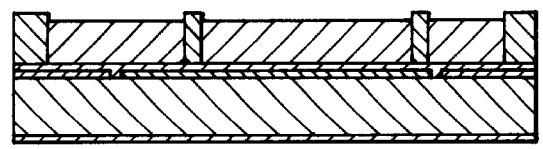

In FIG. 4(b), Ni is filled in a portion, in which no photoresist is provided, by means of plating of Ni.

Figure 4C:
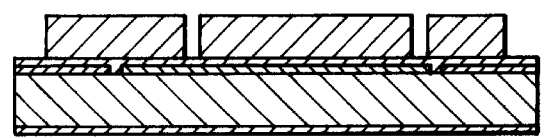

In FIG. 4(c), photoresist is removed by solvent.

Figure 4D:
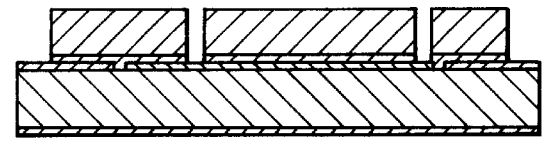

In FIG. 4(d), when the overall surface is subjected to ion milling, an under-layer in a portion not coated with Ni is removed. In this process, the means is not limited to ion milling, but a protective photoresist layer (not shown), the shape of which is the same, may be patterned on the plated Ni-layer.

Figure 4E:
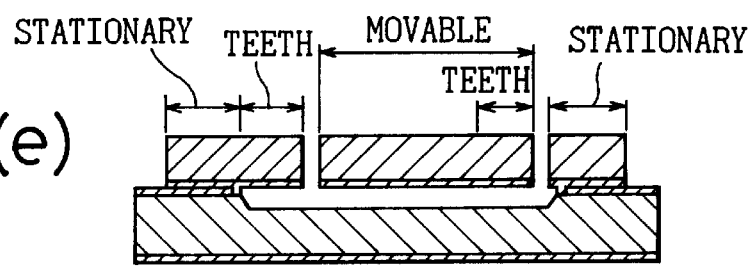

In FIG. 4(e), when Al on the sacrificial layer is removed in a solution of KOH, the movable section 24 is separated from the substrate, so that the movable section 24 can be relatively moved. Since the thermal oxidation film T—SiO$_2$ has been removed from the movable section 24, Si on the substrate is dissolved, and the solution of KOH easily enters. Therefore, the etching time can be decreased. In this connection, in the above explanation, the manufacturing method is described while stress is put on the electrostatic actuator 21. However, it is possible to manufacture a magnetic head slider including rails in the above manufacturing process. The details are described in Japanese Unexamined Patent Publication No. 9-81924.

Next, the operation of the magnetic head slider of the present invention will be explained below.

A minute torque is generated by a large number of teeth 25 to 27 which are arranged in a comb-shape. When voltage is impressed upon the tooth group 26 shown in FIGS. 2(a) and 2(b), an electrostatic force is generated in a direction so that the tooth group 25 is pulled. Therefore, the movable section 24 connected to the tooth group 25 is rotated to the right. When voltage is impressed upon the tooth group 27 shown in FIGS. 2(a) and 2(b), the movable section 24 is rotated to the left.

When the movable section 24 is rotated as described above, as shown in FIG. 5, the MR head and the inductive head 53 can line up in a straight line on the track 51 of the recording medium 50 over the entire region of the track 51 of the recording medium 50. Accordingly, the track density can be made the maximum.

Figure 5:
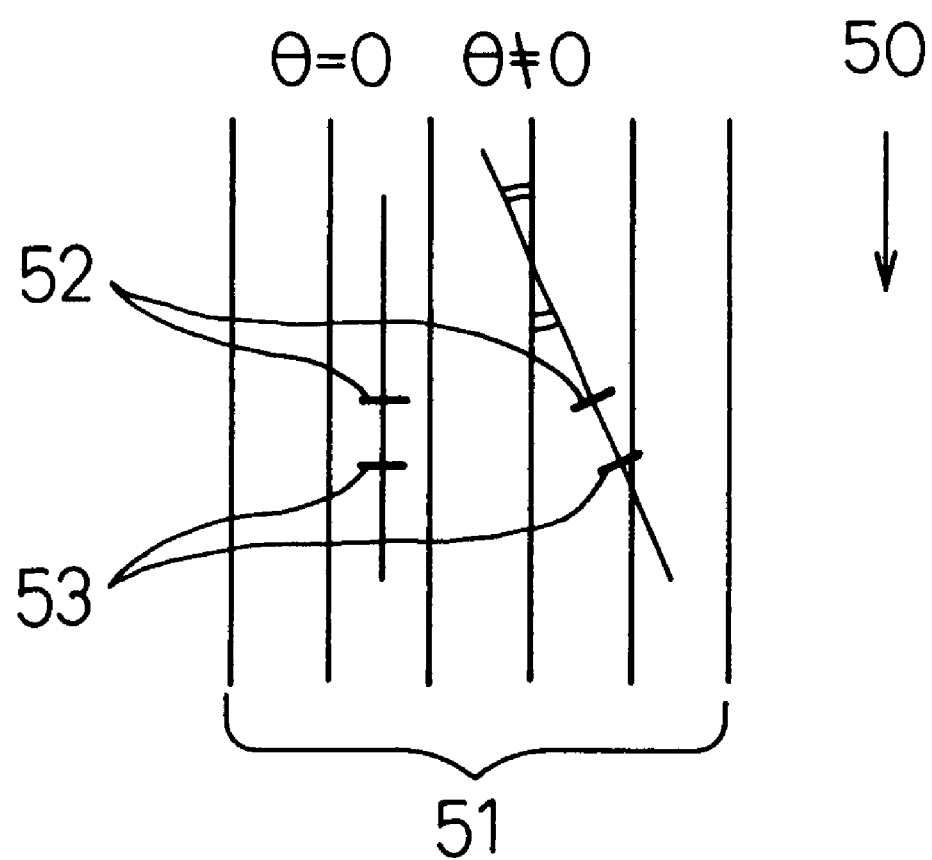
FIG. 5 is a schematic illustration for explaining the correction of a yaw angle.

In FIG. 5, yaw angle θ formed between the head element and the direction of the track 51 is detected, that is, yaw angle θ, which is formed between a straight line connecting MR head 52 with the inductive head 53, and the direction of the track 51, is detected. The voltage to be impressed upon the electrostatic actuator 21 is adjusted by feedback control according to the thus detected yaw angle θ. In this way, yaw angle θ can be set at 0 at all times.

Next, methods of detection and correction of yaw angle θ will be explained below.

In order to detect and correct a yaw angle, first, a quantity of correction of the yaw angle corresponding to the position on the medium is detected. Next, the quantity of correction of the yaw angle is registered on a table. The above operation can be performed after manufacture and before shipment. Next, the slider position is detected. Further, referring to the table, the yaw angle is corrected. The above operation can be performed after the shipment.

Figure 6A:
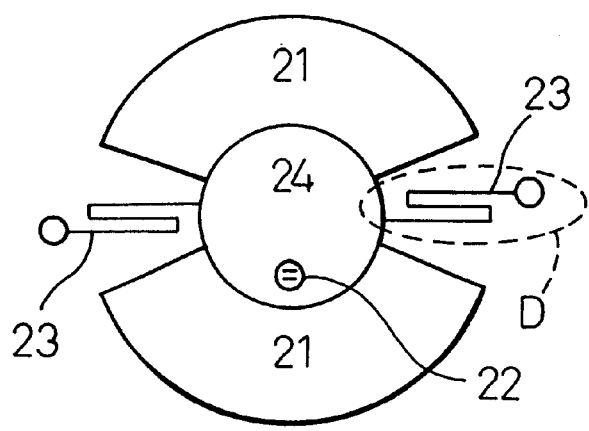
FIG. 6(a) is a plan view of an electrostatic actuator, a strain gauge is attached in which to the support spring.
Figure 6B:
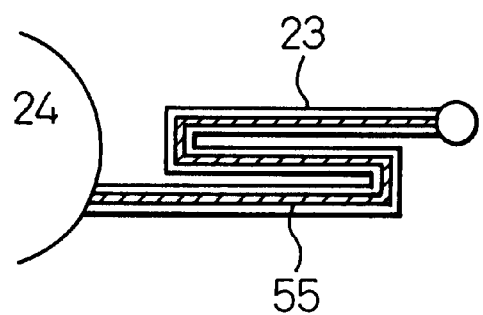
FIG. 6(b) is an enlarged view showing a portion indicated by broken line D in FIG. 6(a)

In order to detect the quantity of correction of the yaw angle, the strain gauges 55 shown in FIGS. 6(a) and 6(b) are used. The strain gauge 55 is arranged on the entire support spring 23 to support the movable section 24 or on a portion of the support spring 23. When the movable section 24 is rotated by the electrostatic actuator 21, the spring 23 is also rotated. At this time, an output signal corresponding to a quantity of rotation can be obtained from the strain gauge 55. Therefore, the quantity of rotation can be found from this output signal.

When the quantity of rotation is found, it is possible to correct the yaw angle. Correction is conducted, for example, in the inspection conducted before shipment. Information is written on the medium by the head element 22. When the information is read in by the head element 22, a quantity of rotation of the head is adjusted by the electrostatic actuator 21 so that an output of the head element 22 can be made maximum. That is, the yaw angle is corrected so that the yaw angle can be made to be 0. This quantity of rotation is a quantity of correction of the yaw angle.

The above correction is conducted on each head according to a position (track) of the slider on each medium, and the thus detected quantity of correction of the yaw angle is registered on the table stored on the disc. Data registered here may be either a quantity of correction of the yaw angle, a voltage impressed upon the electrostatic actuator 21 for correction, or an output signal outputted from the strain gauge 55.

When a quantity of data to be registered is large, correction is conducted for several tracks, and the thus an obtained representative quantity of correction is applied to several tracks. Alternatively, correction is conducted for several tracks, and a quantity of correction is found by calculation under the condition that the quantity of correction changes linearly. The above mentioned operation is required in advance.

Next, control in the case of seeking will be explained below. In the case of seeking, an electric current is made to flow in a boss coil motor (not shown), and the slider is moved to a target track. When this electric current is integrated twice, the present position of the slider can be detected, and it becomes possible to determined the track on the medium over which the slider is located.

Referring to the table stored on the disc which has been previously made, a quantity of correction of the yaw angle (or voltage or output signal) corresponding to the slider position on each medium is determined. In accordance with the thus determined quantity of correction of the yaw angle, the yaw angle is corrected by the electrostatic actuator 21.

In this connection, after the electrostatic actuator 21 has been formed by means of plating, the strain gauge 55 is formed on the entire support spring 23, to support the movable section 24, or on a portion of the support spring 23. The number of the support springs 23 is two in the structure shown in FIGS. 2 and 6. A strain gauge 55 may be formed on one of the two support springs or on each of the two support springs. In the case where a quantity of rotation of the movable section 24 can be accurately found by the strain caused in a portion of the support spring 23, the strain gauge 55 may be formed in a portion of the support spring 23. Even in the above case, it is possible to more accurately detect a quantity of rotation of the movable section 24 when the strain gauge 55 is formed on the entire support spring 23.

As another embodiment, it is possible to use a portion of the comb-shaped teeth of the electrostatic actuator 21 as a strain gauge. The comb-shaped teeth in this portion are not used as an actuator. A pair of comb-shaped teeth shown in FIG. 2(b) are used. However, these comb-shaped teeth are not electrically connected to other comb-shaped teeth. When voltage is impressed upon other portions and the movable portion 24 is rotated, a distance, in which the comb-shaped teeth are engaged with each other, is changed. At this time, an electrostatic capacity of the comb-shaped teeth is also changed. Accordingly, when the electrostatic capacity is measured, a quantity of rotation can be detected.

Figure 7:
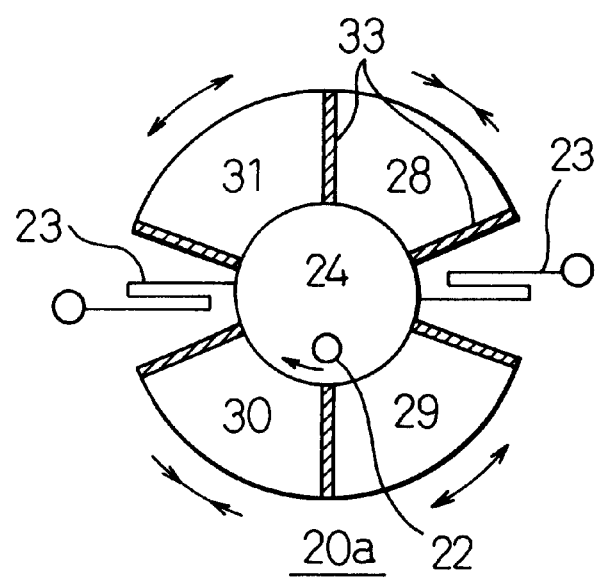
FIG. 7 is a plan view showing an electrostatic actuator in which a piezoelectric element is used.

FIG. 7 is a view showing an electrostatic actuator in which a piezoelectric element is used. In the above embodiment, the force used to rotate the movable section 24 is an electrostatic force generated by the tooth group. Even when the tooth group is replaced with a piezoelectric element, the circumstances are the same. Piezoelectric elements 28, 29, 30, 31, which are divided into four, are arranged in the periphery of the movable section 24 on which the head element 22 is mounted. There are provided electrodes 33 on both sides of the piezoelectric elements 28 to 31. In the same manner as that of the embodiment described before, the movable section 24 is supported by the stationary section 20a via the support springs 23. A Voltage is impressed upon the piezoelectric elements 29, 31 in a direction so that they can be extended, and also voltage is impressed upon the piezoelectric elements 28, 30 in a direction so that they can be contracted. Due to the foregoing, the movable section on which the head element 22 is mounted is minutely rotated clockwise as shown by an arrow in the drawing. When voltage, the polarity of which is opposite to the above voltage, is impressed upon the piezoelectric elements 28, 29, 30, 31, the movable section 24 is minutely rotated counterclockwise. When the movable section 24 is rotated by the above method so that MR head and the inductive head can line up in a straight line in the case of reading and writing, the track density can be increased to the maximum.

As explained above, the present invention can provide the following effect. According to the magnetic slider head of the present invention, when the movable section is minutely rotated with respect to the stationary section by the force generated by the electrostatic actuator or the piezoelectric element, the MR head and the inductive head can be lined up in a straight line in the case of reading and writing. Therefore, the track density can be increased to the maximum.

What is claimed is:

1. A magnetic head slider adapted to be opposed to a recording medium comprising: a slider film body provided on a surface of a substrate or on a surface of a sacrificial layer provided on a substrate, the substrate or the sacrificial layer and substrate being separate from the slider film body; a rotating mechanism supported by a stationary section of the slider body so that a movable section of the rotating mechanism which is a portion of the slider body can be rotated in a plane substantially in parallel to a surface of the recording medium, and at least an opposed magnetic pole of a magnetic head element adapted to be opposed to the recording medium, provided in a movable section of the rotating mechanism;

said rotating mechanism comprising a plurality of support springs arranged along a periphery of said movable section at certain intervals of angles to support said movable section onto the stationary section so that said movable section can be rotated with respect to the stationary section wherein said movable section is coupled to said stationary section by said support springs.

2. A magnetic head slider as set forth in claim 1, wherein the head slider further comprises a drive-force-generating section for driving the movable section with respect to the stationary section against an elastic force of the support spring, by an electrostatic attraction force acting between the opposed surfaces of the movable and the stationary sections when a voltage is applied between opposed surfaces.

3. A magnetic head slider as set forth in claim 2, wherein the drive-force-generating section comprises a stationary section having a plurality of teeth parallel to each other, a movable section having a plurality of teeth parallel to the teeth of the stationary section, said support spring for supporting the movable section so that the movable section can be moved with respect to the stationary section in a tooth width direction, and said drive-force generating section for moving the movable section to a position at which an electrostatic attraction force in the tooth width direction, generated when a voltage is applied between the teeth of the stationary section and those of the movable section, is balanced by said elastic force of the support spring.

4. A magnetic head slider as set forth in claim 1, wherein a drive mechanism for driving the movable section with respect to the stationary section is composed of a piezoelectric element.

5. A magnetic head slider as set forth in claim 1, wherein the movable section is driven with respect to the stationary section so that an orientation of the magnetic head element and a direction of a track of the recording medium agree.

6. A magnetic head slider as set forth in claim 1, wherein the movable section is driven with respect to the stationary section so that an orientation of the magnetic head element follows a direction of a track of the recording medium agree.

* * * * *